US012681909B2

(12) United States Patent　　　(10) Patent No.: US 12,681,909 B2
Natanzon et al.　　　　　　　　　　(45) Date of Patent:　Jul. 14, 2026

(54) TECHNIQUES FOR REDUCING BACKUP READ ACCESS IN DIFFERENTIAL BACKUP OF DATABASES

(71) Applicant: Eon IO, Ltd., Tel Aviv (IL)

(72) Inventors: Assaf Natanzon, Tel Aviv (IL); Dmitry Kuznetsov, Tel Aviv Yafo (IL); Ron Kimchi, Tel Aviv (IL); Ofir Ehrlich, Tel Aviv (IL); Yaniv Ptashnik, Tel Mond (IL); Peleg Kazaz, Tel Aviv (IL); Ran Mizrachi, Mishmar Hashiva (IL); Benjamin Gruenbaum, Herzliya (IL)

(73) Assignee: Eon IO, Ltd., Tel Aviv (IL)

( * ) Notice: Subject to any disclaimer, the term of this patent is extended or adjusted under 35 U.S.C. 154(b) by 0 days.

(21) Appl. No.: 19/002,288

(22) Filed: Dec. 26, 2024

(65) Prior Publication Data

US 2026/0187040 A1　　Jul. 2, 2026

(51) Int. Cl.
*G06F 16/21*　　　(2019.01)
*G06F 16/215*　　 (2019.01)
*G06F 16/22*　　　(2019.01)

(52) U.S. Cl.
CPC .......... *G06F 16/215* (2019.01); *G06F 16/221* (2019.01)

(58) Field of Classification Search
CPC ..................................................... G06F 16/215

USPC ......................................................... 707/640
See application file for complete search history.

(56) References Cited

U.S. PATENT DOCUMENTS

2020/0250188 A1 * 8/2020 McCracken ........ G06F 16/2322

FOREIGN PATENT DOCUMENTS

CN　　　　109684304 A　 *　4/2019　 .......... G06F 11/1448
WO　　WO-2012178072 A1 * 12/2012　 .......... G06F 16/254
WO　　WO 202418315 A1 *　5/2024　 ............. G06Q 10/06

* cited by examiner

*Primary Examiner* — Syling Yen
(74) *Attorney, Agent, or Firm* — M&B IP Analysts, LLC

(57)　　　　　　　ABSTRACT

A method and system for reducing deduplication in database backup are provided. The method includes selecting a first primary key of a database; extracting a plurality of row groups from the database based on the selected first primary key; storing the plurality of row groups arranged according to the first primary key in a file having a column-oriented data storage format as a database backup at a first time; reading at least a portion of the database backup at a second time to detect a plurality of changes; determining a position of each row corresponding to a change of the plurality of changes; selecting a second primary key of the database as a primary key; and generating a database backup of the database at the second time based on the selected second primary key.

19 Claims, 4 Drawing Sheets

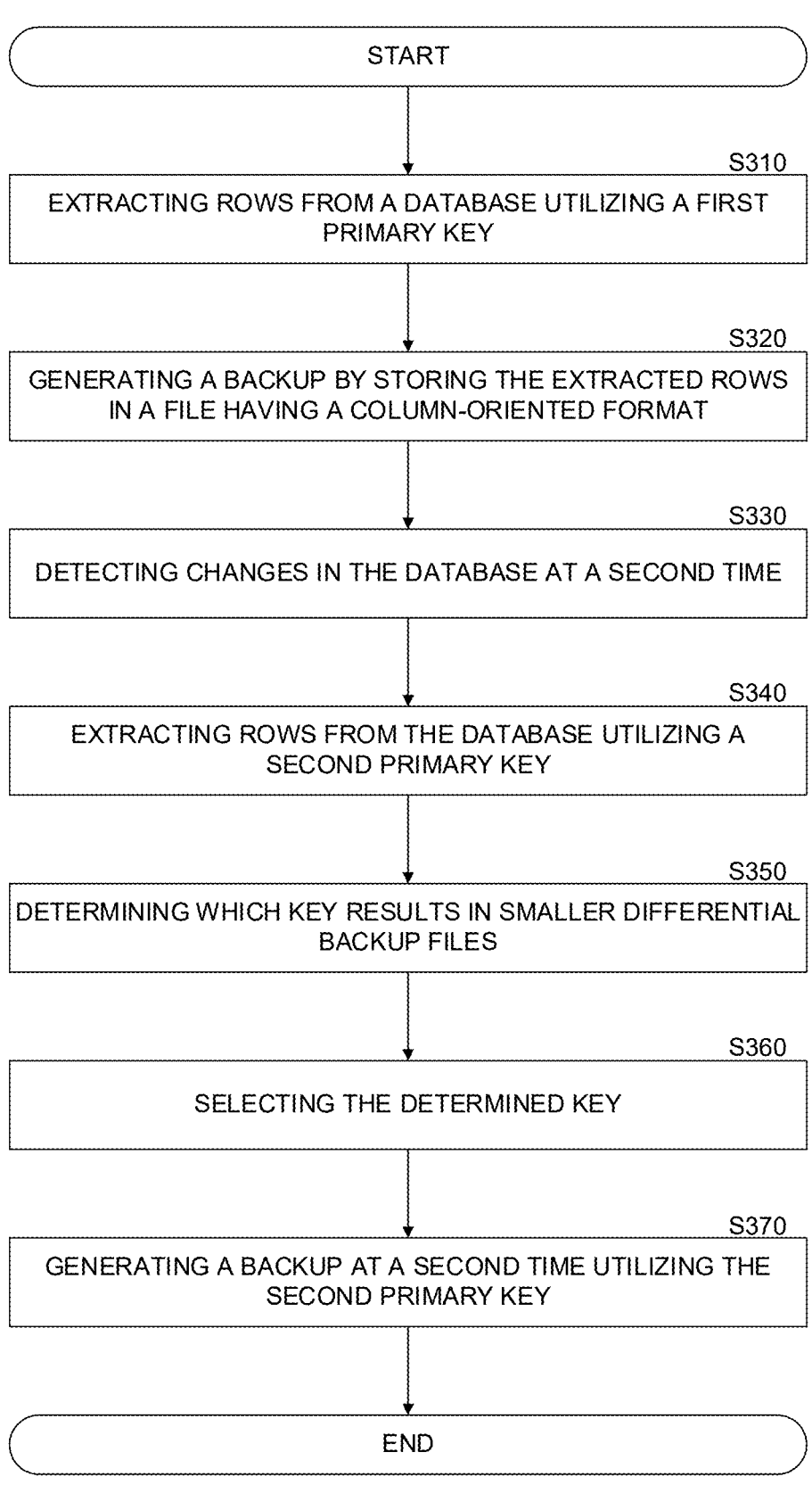

START

S310

EXTRACTING ROWS FROM A DATABASE UTILIZING A FIRST PRIMARY KEY

S320

GENERATING A BACKUP BY STORING THE EXTRACTED ROWS IN A FILE HAVING A COLUMN-ORIENTED FORMAT

S330

DETECTING CHANGES IN THE DATABASE AT A SECOND TIME

S340

EXTRACTING ROWS FROM THE DATABASE UTILIZING A SECOND PRIMARY KEY

S350

DETERMINING WHICH KEY RESULTS IN SMALLER DIFFERENTIAL BACKUP FILES

S360

SELECTING THE DETERMINED KEY

S370

GENERATING A BACKUP AT A SECOND TIME UTILIZING THE SECOND PRIMARY KEY

END

FIGURE 3

TECHNIQUES FOR REDUCING BACKUP READ ACCESS IN DIFFERENTIAL BACKUP OF DATABASES

TECHNICAL FIELD

The present disclosure relates generally to increasing efficiency in deduplication and differential backup generation, and specifically to selecting a primary key for a database read

BACKGROUND

A database backup is a copy of a database taken to protect against data loss, corruption, or other failures. It allows recovery of the database to a previous state, ensuring business continuity and data integrity. Backups can be full (capturing the entire database), incremental (storing changes since the last backup), or differential (storing changes since the last full backup). They are essential for disaster recovery, regulatory compliance, and maintaining operational resilience.

A challenge with deduplication, which is the process of eliminating redundant data to save storage space, arises in the context of database backups due to the complexity and dynamic nature of databases. Deduplication typically works well for static data, but databases frequently undergo changes, such as updates, deletes, and inserts, which create variations in data blocks. Identifying redundancy becomes more difficult when backup files are structured differently or when databases include compressed or encrypted data.

Another issue with deduplication processes is the potential impact on backup performance. A deduplication process typically involves additional processing to identify and eliminate duplicates, which can slow down backup operations, especially for large, high-transaction databases. Additionally, the deduplication process itself can sometimes fail to recognize patterns or redundancies, particularly in environments with complex data structures or highly fragmented storage, resulting in suboptimal storage savings.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

In one general aspect, method may include selecting the first primary key of a database. The method may also include extracting a plurality of row groups from the database based on the selected first primary key. Method may furthermore include storing the plurality of row groups arranged according to the first primary key in a file having a column-oriented data storage format as a database backup at a first time. Method may in addition include reading at least a portion of the database backup at a second time to detect a plurality of changes. The method may moreover include determining the position of each row corresponding to a change of the plurality of changes. The method may also include selecting a second primary key of the database as a primary key when utilizing the second primary key generates a smaller number of row groups than utilizing the first primary key, where the smaller number of row groups includes a change in at least a row. The method may furthermore include generating a database backup of the database at a second time based on the selected second primary key. Other embodiments of this aspect include corresponding computer systems, apparatus, and computer programs recorded on one or more computer storage devices, each configured to perform the actions of the methods.

In one general aspect, non-transitory computer-readable medium may include one or more instructions that, when executed by one or more processors of a device, cause the device to: select a first primary key of a database; extract a plurality of row groups from the database based on the selected first primary key; store the plurality of row groups arranged according to the first primary key in a file having a column-oriented data storage format as a database backup at a first time; read at least a portion of the database backup at a second time to detect a plurality of changes; determine a position of each row corresponding to a change of the plurality of changes; select a second primary key of the database as a primary key, when utilizing the second primary key generates a smaller number of row groups than utilizing the first primary key, where the smaller number of row groups includes a change in at least a row; and generate a database backup of the database at the second time based on the selected second primary key. Other embodiments of this aspect include corresponding computer systems, apparatus, and computer programs recorded on one or more computer storage devices, each configured to perform the actions of the methods.

In one general aspect, the system may include one or more processors configured to: System may also include selecting the first primary key of a database. The system may furthermore include extracting a plurality of row groups from the database based on the selected first primary key. The system may in addition include storing the plurality of row groups arranged according to the first primary key in a file having a column-oriented data storage format as a database backup at a first time. The system may moreover include reading at least a portion of the database backup a second time to detect a plurality of changes. The system may also include determining the position of each row corresponding to a change of the plurality of changes. The system may furthermore include selecting a second primary key of the database as a primary key when utilizing the second primary key generates a smaller number of row groups than utilizing the first primary key, where the smaller number of row groups includes a change in at least a row. The system may in addition include generating a database backup of the database at a second time based on the selected second primary key. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 3 is an example flowchart of a method for selecting a primary key for generating a backup for minimizing differential backup size, implemented in accordance with an embodiment.

DETAILED DESCRIPTION

Figure 1:
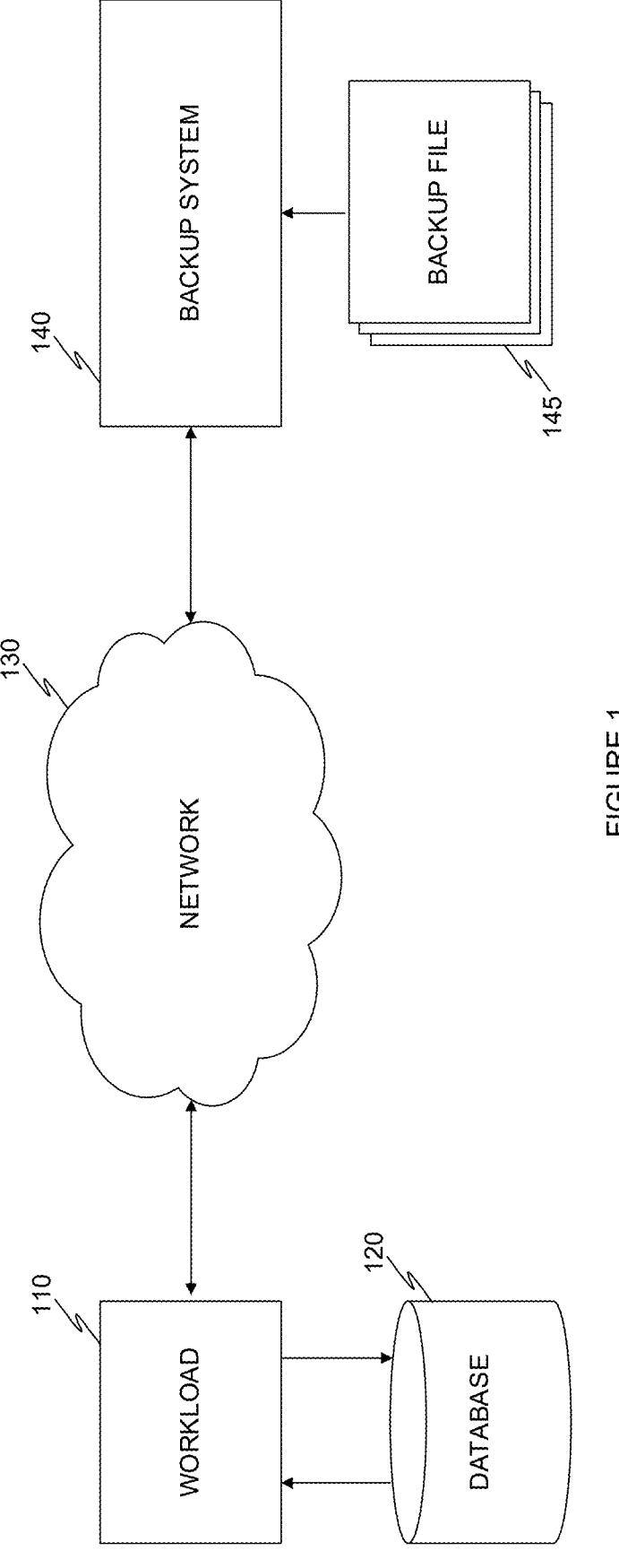
FIG. 1 is an example network diagram including a database backup system, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

FIG. 1 is an example network diagram including a database backup system, utilized to describe an embodiment. In an embodiment, a database 120 includes a database application, a database management system (DBMS), a combination thereof, and the like. In some embodiments, the database 120 is a column-oriented database. In an embodiment, the database 120 is a relational database, a tabular relational database, and the like. For example, in an embodiment, the database 120 is implemented using SQL, MySQL, PostgreSQL®, NoSQL, MongoDB®, and the like query languages. In an embodiment, the database 120 includes metadata, such as a database schema. In some embodiments, the database schema includes a data structure, such as a table, including a plurality of keys, at least a portion of which correspond to columns of the table.

In certain embodiments, the database 120 is deployed on a workload 110. In an embodiment, the workload 110 is a physical computing device, a virtual computing device (e.g., a virtual machine), a combination thereof, and the like.

According to an embodiment, the workload 110 is implemented as a virtual machine, a software container, a serverless function, a combination thereof, and the like. In some embodiments, the database 120 is implemented as a managed database, for example utilizing Amazon® RDS. In an embodiment, a virtual machine is deployed as an Amazon® EC2 instance. A software container is deployed, according to an embodiment, on a container platform such as Kubernetes®, Docker®, and the like. In some embodiments, a serverless function is deployed as an Amazon® Lambda function.

In an embodiment, the workload 110 is configured to provide access to the database 120, for example over a network 130. In some embodiments, a cloud computing infrastructure is implemented on the network 130. For example, in an embodiment, a cloud computing infrastructure is Amazon® Web Services (AWS), Google® Cloud Platform (GCP), Microsoft® Azure, and the like. In certain embodiments, the cloud computing infrastructure is utilized to deploy a cloud computing environment. In an embodiment, a cloud computing environment is a virtual private cloud (VPC), a virtual network (VNet), a virtual private network (VPN), a combination thereof, and the like.

In some embodiments, the workload 110 is configured to provide access to the database 120 to a database backup system 140 (also referred to as backup system 140). In an embodiment, the backup system 140 is configured to generate a backup of the database 120. In an embodiment, the backup system 140 is implemented as a virtual machine, a software container, a serverless function, a combination thereof, and the like. In some configurations, the database backup system 140 is configured to generate a snapshot of the database 120 and access the snapshot that was generated at a specific point in time. In such configurations, the system 140 does not directly access the database 120.

In an embodiment, the backup system 140 is configured to generate a backup of a database by determining a primary key of the database 120. In some embodiments, the database backup includes a data backup and a machine backup. For example, according to an embodiment, the data backup includes only data from the database. In some embodiments, only data of the database includes data exported from the database, a database schema, a combination thereof, and the like.

In an embodiment, the machine backup includes data, information, and the like, which allows the generation of a restored machine (i.e., a restored virtualization) which is configured to host a database application capable of exposing the data restored from the data backup. In an embodiment, the machine is a virtualization instance such as a virtual machine, a software container, a serverless function, a combination thereof, and the like.

According to an embodiment, data, information, and the like that allow for the generation of a restored machine include a filesystem, a directory, a registry, configuration information, software product keys, a combination thereof, and the like. For example, according to an embodiment, machine backup includes an identifier of an operating system (such as Windows®, Linux®, etc.), an identifier of a database application (e.g., Apache® Derby), a filesystem, a registry file, a configuration file, a combination thereof, and the like.

In some embodiments, generating a machine backup is performed by mounting the file system of a virtual machine that hosts the database application, and generating a file-level backup that omits log files, table files, and the like data files of the database application. For example, in an embodiment, a file-level backup includes generating a storage-based snapshot of the virtual machine, i.e., a snapshot of at least a block device attached to the virtual machine, mounting the snapshot to a second virtual machine, and exporting data from the second virtual machine into a data backup. In an embodiment, exporting data includes executing a plurality of queries on a database application of the second virtual machine, where each query returns a plurality of rows of data from the database. Such data exportation from a database is discussed in more detail with respect to FIG. 3 below. In an embodiment, data exportation can be performed by parsing the DB files of the file system.

In an embodiment, generating a machine backup includes generating a block-level backup of a virtual machine on which the database application is deployed. In some embodiments, data blocks which include data from the database are released, so that they are not stored as part of the machine backup. This ensures that a block-level backup of the machine only is generated, without any of the data of the database application, the latter stored separately as a database data backup.

According to an embodiment, at least a file that includes database data is zeroed out, punched out, etc., prior to generating a machine backup (i.e., a backup of a state of the virtual machine without any of the data of the database). In some embodiments, a table from a database application is dropped on a restored virtual machine prior to inserting the backed-up data. In an embodiment, dropping a table from a database application includes erasing all records (i.e., all data rows), deleting indexes, triggering permissions, etc., breaking foreign key constraints, releasing storage space assigned to the table, a combination thereof, and the like. In some embodiments, metadata of the database application is stored as part of the machine backup. In an embodiment, metadata includes a store procedure, a view, a schema, a combination thereof, and the like.

In certain embodiments, generating a machine backup includes detecting software applications deployed, executed, etc., on the workload 110 and storing a product key for each detected application. For example, in an embodiment, Apache® Derby is detected on workload 110, and a product key for Apache® Derby is stored as a portion of the machine backup.

In an embodiment, when restoring the machine (e.g., the workload 110) from the machine backup, the product key is accessed, and a new installation of Apache® Derby is deployed on the restored machine. In an embodiment, restoring a machine includes configuring an orchestrator of a cloud computing environment to deploy a virtual machine (e.g., an Amazon® EC2) in a cloud computing environment.

In certain embodiments, storing such product keys allows for generating a machine with software applications that are up to date. This, in turn, reduces the risk of a cybersecurity breach due to vulnerable versions of software that can be deployed from a more straightforward database backup. This allows the creation of separate backups for the database data and the database software application (i.e., the machine backup).

In some embodiments, detecting a product key includes scanning a virtual machine, a disk of the virtual machine, and the like, to detect thereon a stored product key. In some embodiments, a product key is detected by accessing a registry of a machine, workload, virtual instance, and the like, and reading therefrom a product key, a plurality of product keys, and the like. In some embodiments, the product key is associated with an identifier of a software application. In certain embodiments, a software repository is determined, from which a software application can be downloaded, installed, etc., on a virtualization, based on the product key. For example, in some embodiments, an orchestrator is provided with a product key when instructed to deploy a virtualization and a software application is selected from a software repository accessible to the orchestrator.

In some embodiments, the backup system 140 is configured to generate a restored database. In an embodiment, the backup system 140 is configured to restore a machine backup into an operational machine (e.g., a virtual machine deployed in a cloud computing environment) and is further configured to restore database data into the restored (i.e., operational) machine, for example by utilizing the methods described in more detail herein, which results in a restored database.

In an embodiment, the backup system 140 is configured to generate a data backup based on the data stored in database 120. In certain embodiments, the data backup includes a plurality of backup files 145. In an embodiment, the backup files 145 is a plurality of data files, stored each as a column-oriented data file. A column-oriented data file is, for example, Apache® Parquet. In an embodiment, values of each column of the database are stored in serial, contiguous, and the like, memory locations, which allows several benefits, such as improved column-wise compression and reduced query execution processing by reading only the column and not an entire row of data, where the contents of the row may not be relevant to the query.

In an embodiment, the backup system 140 is configured to determine a primary key of the database. In some embodiments, the backup system 140 is configured to generate a plurality of queries based on the primary key, each query returning a plurality of rows of data from the database. In an embodiment, the plurality of rows are stored as at least a column-oriented data file, e.g., the backup files 145.

According to an embodiment, a primary key is a database key that includes values that are unique for each row. For example, a primary key is, in an embodiment, an index value. As no two rows can have the same index value, an index value can be used as a primary key. In some embodiments, a primary key is a composite key, i.e., a combination of a key value of a first column and a key value of a second column, which together form a unique value.

Figure 2:
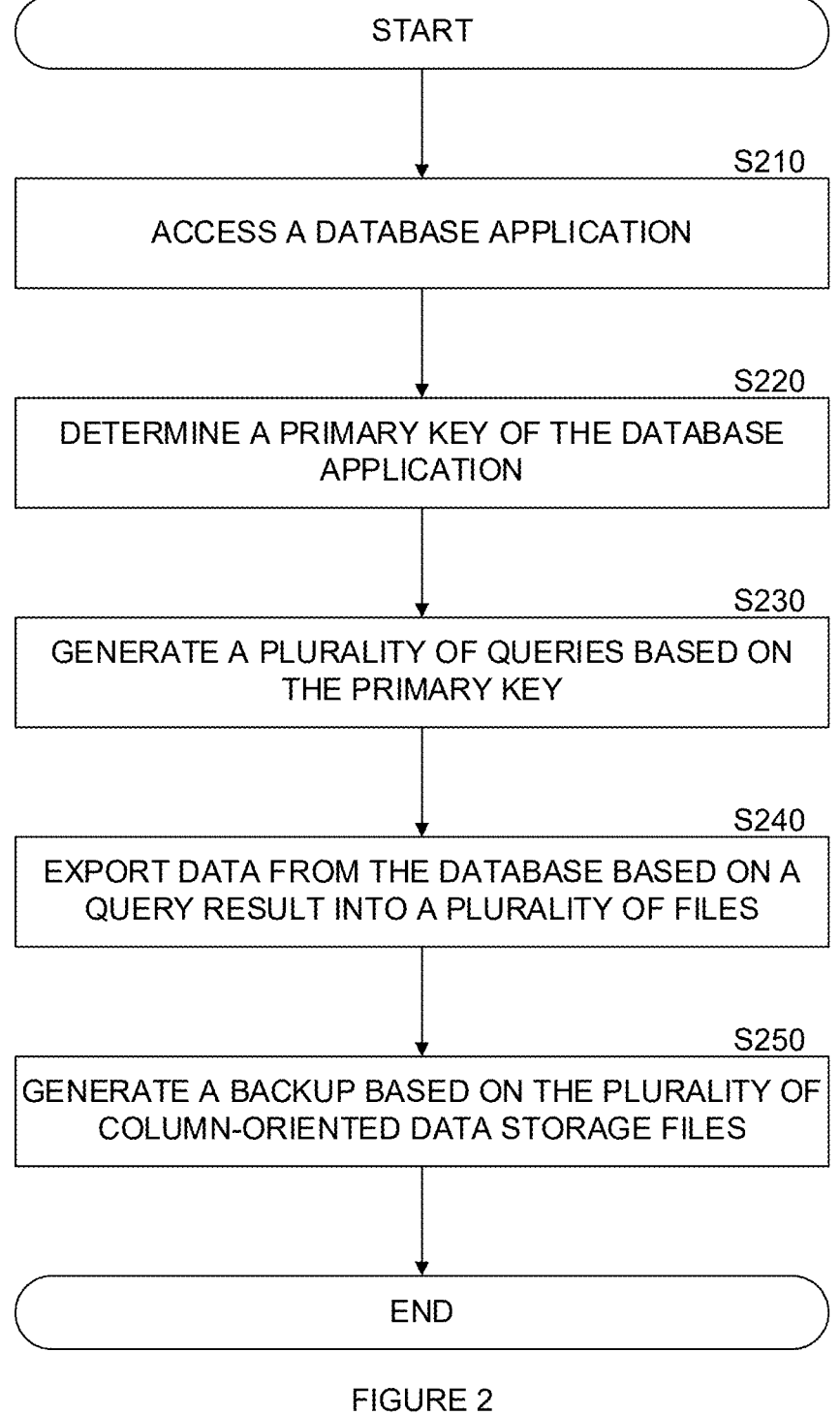
FIG. 2 is an example flowchart of a method for generating a database backup, implemented in accordance with an embodiment.

FIG. 2 is an example flowchart of a method for generating a database backup, implemented in accordance with an embodiment. The method may be performed by the backup system 140. In an embodiment, generating a database backup includes generating a backup of the machine hosting the database (which omits the data of the database) and generating a backup of the data of the database as two distinct backups.

At S210, a database application is accessed. In an embodiment, accessing a database application includes detecting a database application deployed in a computing environment, such as a cloud computing environment. According to some embodiments, accessing a database application includes receiving a token, a credential, a combination thereof, and the like, to access the database. In an embodiment, accessing the database application includes accessing a machine, a workload, and the like, on which the database application is deployed.

According to certain embodiments, the database application is a stand-alone database application deployed on a virtual machine. In an embodiment, a stand-alone database application is, for example, PostgreSQL, SQLite, MySQL, Oracle® Database, and the like.

At S220, a primary key of the database is determined. In an embodiment, the primary key is overridden, for example, by a user input. In some embodiments, the primary key is an index of rows, for example. In an embodiment, the primary key includes a value assigned to each row, which is a unique value, such that no two rows include the same value of the primary key.

In some embodiments, a primary key is generated based on a composite of multiple-column identifiers. For example, in an embodiment, two identifiers, each of a distinct column, form together a primary key. In certain embodiments, a plurality of primary keys are selected, each primary key corresponding to a table of the database.

At S230, data is exported from the database. In an embodiment, exporting data from the database includes generating a plurality of queries. In an embodiment, a plurality of queries are generated, each based on a value range of the primary key. For example, in an embodiment, a first query of the plurality of queries is generated based on a value range of '0' to '10,000' of the primary key, and a second query of the plurality of queries is generated based on a value range of '10,001' to '20,000'. In an embodiment, there is no overlap between the values of the primary key for each of the generated queries. In an embodiment, the query is generated in a query language, such as SQL. In another embodiment, S230 includes parsing the database's files of the file system to export data from the database.

In an embodiment, data is exported from the database utilizing a logical backup. For example, in a PostgreSQL database, a pg_dump command is utilized to export data from a database application to a logical backup. According to an embodiment, a logical backup includes schema and data as query language (e.g., SQL) commands, binary format, and the like. In an embodiment, a logical backup includes backing up only data from database 140. That is, in a logical backup, configuration files, raw files, directories, etc., are not stored as part of the logical backup. In contrast, in a physical backup configuration files, raw files, directories, and the like, are stored as part of the physical backup.

At S240, a plurality of files is generated. In an embodiment, the plurality of files is generated in a column-oriented data format, such as Apache® Parquet. In some embodiments, the plurality of files is generated such that a file, a group of files, etc., corresponds to a result of executing a query of the plurality of queries. Thus, data is exported from the database into a plurality of data files.

In an embodiment, data is exported from the database application into the plurality of files by generating the plurality of queries, executing each query on the database, receiving a result for each query, and storing the results as a plurality of data files in a column-oriented data format.

In an embodiment, for example, where a logical backup is generated (e.g., utilizing pg_dump command), the files are generated by converting the logical backup into a plurality of column-oriented data format files. In another embodiment, the files are generated by parsing the database files.

At S250, a database data backup is generated. In an embodiment, the data backup is generated based on the plurality of data files. In some embodiments, the data backup includes a timestamp, a version identifier, and the like, which indicate a date, a time, a combination thereof, and the like, at which the data backup was generated. In an embodiment, the data backup is utilized in restoring a database. In certain embodiments, the data backup is stored in a cloud storage environment, such as AWS S3.

In some embodiments, the data backup includes a data structure, such as metadata of the database, a data schema of the database, table data, a store procedure, a view, a combination thereof, and the like. In an embodiment, database data (e.g., schema, views, store procedures, etc.) are extracted from a dump, for example utilizing pg_dump, without storing the data itself. Thus, a pg_dump command can be utilized to generate the data files (e.g., Parquet files) and to generate the machine backup, e.g., by extracting the metadata of the database, including views, store procedures, schema, etc.

It should be noted that a data backup is not the same as a storage backup. In a storage backup, a block-for-block copy of the storage device is created, which includes the database data and additionally, a lot of data that is not useful for the actual database application, such as temporary files. It is therefore advantageous to store a backup only of the data on the database, without all the unnecessary files, folders, etc., which are not essential for the database to function properly.

In certain embodiments, a machine backup is generated, which includes data of the machine that is utilized to deploy the database application. Restoring a machine backup to a machine allows deployment of a machine that functions as the original machine, sans the data of the database. Once the data of the database application is written there, the machine is fully restored and functional.

In an embodiment, a machine backup is generated as a file-level backup, as a block-level backup, as a product key store, a combination thereof, and the like.

In an embodiment, a machine backup includes data, information, and the like, which is utilized in restoring a machine. In some embodiments, restoring a machine includes generating a new machine according to the parameters of the original machine hosting the database.

FIG. 3 is an example flowchart of a method for selecting a primary key for generating a backup for minimizing differential backup size, implemented in accordance with an embodiment. In an embodiment, it is advantageous to detect a key that allows for grouping together of rows that change, when utilizing column-oriented file formats for storing a backup.

For example, by grouping together changes in the database, such that rows that are likely to change are in the same row group, the total number of row groups that include a row that is changed is reduced, and thus the number of differential backups that need to be stored is likewise reduced. As an example, when a first-row group includes a row that has a change, and a second-row group includes a row that has a change, a differential backup needs to be generated for each row group. However, if it is possible to regroup the rows, such that the two rows that include a change are in the same group, then only a single group requires a differential backup, which reduces the amount of storage required for the backup.

In some embodiments, the backup is stored in a plurality of objects referred to as "backup objects." According to an embodiment, these backup objects are arranged, ordered, and the like, in such a way that only a relatively small number of them typically need to be updated. This approach leads to more efficient backup and deduplication processes. For example, consider a table in an append-only database that includes two columns: Social Security Number (SSN) and the date when each respective SSN was added to the table. In this case, the rows of the table are ordered by the date column. An append-only database is a type of database where data can only be added, so organizing the data by date during a backup minimizes the number of updates to the backup, as previous data record reads are minimal. Alternatively, arranging such a backup by ascending (or descending) order of the SSN itself might result in having to read a previous data record of a backup (which includes several rows), and updating that data record to now include the new data for a current backup.

As another example, consider a database table that includes three columns: age, date of birth, and name. The age column is updated when a person's birthday occurs. Therefore, it is more efficient, according to an embodiment, to order the data according to a key that includes the date of birth, as this grouping would require fewer changes when updates are made.

At S310, a plurality of rows are extracted from a database. In an embodiment, the plurality of rows is extracted utilizing a primary key of the database. In some embodiments, a primary key is generated based on a composite of multiple-column identifiers. For example, in an embodiment, two identifiers, each of a distinct column, form together a primary key. In certain embodiments, a plurality of primary keys are selected, each primary key corresponding to a table of the database. In an embodiment, a primary key is a database key which is an attribute or a set of attributes in a database table that is used to identify and establish relationships between records uniquely. For example, according to an embodiment, the primary key is an index key. In some embodiments, the key is a unique key, which ensures all values in a column or combination of columns are unique across records. In certain embodiments, the key is a composite key, such as selected by a combination of columns.

In an embodiment, the plurality of rows are extracted from the database utilizing the methods discussed in more detail herein, for example with respect to FIG. 2. In an embodiment, the primary key includes a value assigned to each row, which is a unique value, such that no two rows include the same value of the primary key.

At S320, a backup is generated. In an embodiment, the backup includes a plurality of files. In some embodiments, the plurality of files is generated in a column-oriented data format, such as Apache® Parquet. In some embodiments, the plurality of files is generated such that a file, a group of files, etc., corresponds to a result of executing a query of the plurality of queries. Thus, data is exported from the database into a plurality of data files.

In an embodiment, data is exported from the database application into the plurality of files by generating the plurality of queries, executing each query on the database, receiving a result for each query, and storing the results as a plurality of data files in a column-oriented data format.

In some embodiments, for example, where a logical backup is generated (e.g., utilizing pg_dump command), the plurality of files is generated by converting the logical backup into a plurality of column-oriented data format files.

In certain embodiments, the plurality of files comprises together a backup of the database at a first time. In some embodiments, a backup of the database is performed periodically, such as every 24 hours.

At S330, a change is detected in the database. In an embodiment, a plurality of changes is detected, each change corresponding to a changed value in a row of the plurality of rows of the database.

In certain embodiments, a change includes a deleted row, an updated row, an added row, a combination thereof, and the like. In an embodiment, a database utilizes a primary key that optimizes the storage and retrieval of data from the database. Such a primary key is not necessarily the optimal key for minimizing the amount of data stored in the differential backups.

According to an embodiment, detecting a change includes reading a row, a group of rows, etc., from a database (e.g., by querying the database based on utilization of a range of values of the primary key), and comparing a value of a row, a hash value of a plurality of rows, etc., to a corresponding value stored in the backup.

At S340, a plurality of rows are extracted utilizing a second primary key. In an embodiment, the second primary key is a key of the database which is different than the first primary key. In certain embodiments, the second primary key is a composite key, including the first primary key, and another key, including a plurality of keys that are not the first primary key, etc.

In some embodiments, a first sample row group is extracted from the database, utilizing the first primary key, and another sample row group is extracted from the database utilizing the second primary key at a first time. For example, in an embodiment, 100 rows are read from the database utilizing the first primary key, and 100 rows are read from the database utilizing the second primary key. In an embodiment, each sample row group includes a plurality of row groups, wherein a portion of the row groups include a row having a change. At a second time, a check is performed to determine the number of row groups that change as a result of changes to the database read at a second time. For example, the rows that were extracted using the first primary key have 10-row groups that include a change, and rows that were extracted using the second primary key have 2-row groups that include a change, therefore selecting the second primary key as the primary key for generating a database is more efficient.

At S350, a determination is made based on a number of changed rows in a row group. According to an embodiment, it is determined which of the keys being utilized results in a smaller number of row groups which include therein a change. In other words, selecting a key which results in changes being grouped into a minimal number of row groups. By minimizing the number of row groups which includes a change, the system is configured to minimize the number of row groups for which it needs to store a differential backup.

In an embodiment, a plurality of second keys is selected, each resulting in a different number of row groups which includes a row having a change. A row group having a change includes a row group having an updated row, a row group having a deleted row, a row group having an added group, a combination thereof, and the like.

At S360, a primary key is selected. In an embodiment, the primary key is selected to minimize the number of row groups which include a row having a change. In some embodiments, the primary key is selected between the first primary key and one or more second primary keys. In certain embodiments, the primary key is selected based on a result of a sampling row group, as discussed above.

In an embodiment, the primary key is selected periodically. For example, in some embodiments, the primary key is selected once a month. In certain embodiments, the primary key is selected every period of time. In certain embodiments, selecting a primary key is based on a number of database changes, based on backup times (e.g., every 7 backups), a combination thereof, and the like. In some embodiments, the first primary key is selected according to the primary key defined for the database, and a second primary key is selected at a second time (e.g., in one month).

In some embodiments, where the same primary key is determined to result in a minimal number of row groups having a changed row multiple times, the backup system is configured to select the primary key and cease periodically checking for a second primary key.

At S370, a second backup is generated at a second time utilizing the second primary key. In an embodiment, prior to generating the second backup, the column-oriented files which comprise the backup of the database based on the first primary key are rearranged based on the second primary key.

In certain embodiments, a second backup is generated periodically, each period based on the second primary key.

According to an embodiment, where a changed row is detected, a differential backup is stored, so that only a backup for a row group having a row that includes a change is stored. In some embodiments, a manifest is generated which includes a timestamp of the differential backup, which allows the backup system to generate a restoration point based on the generated backup and at least the differential backup.

Figure 4:
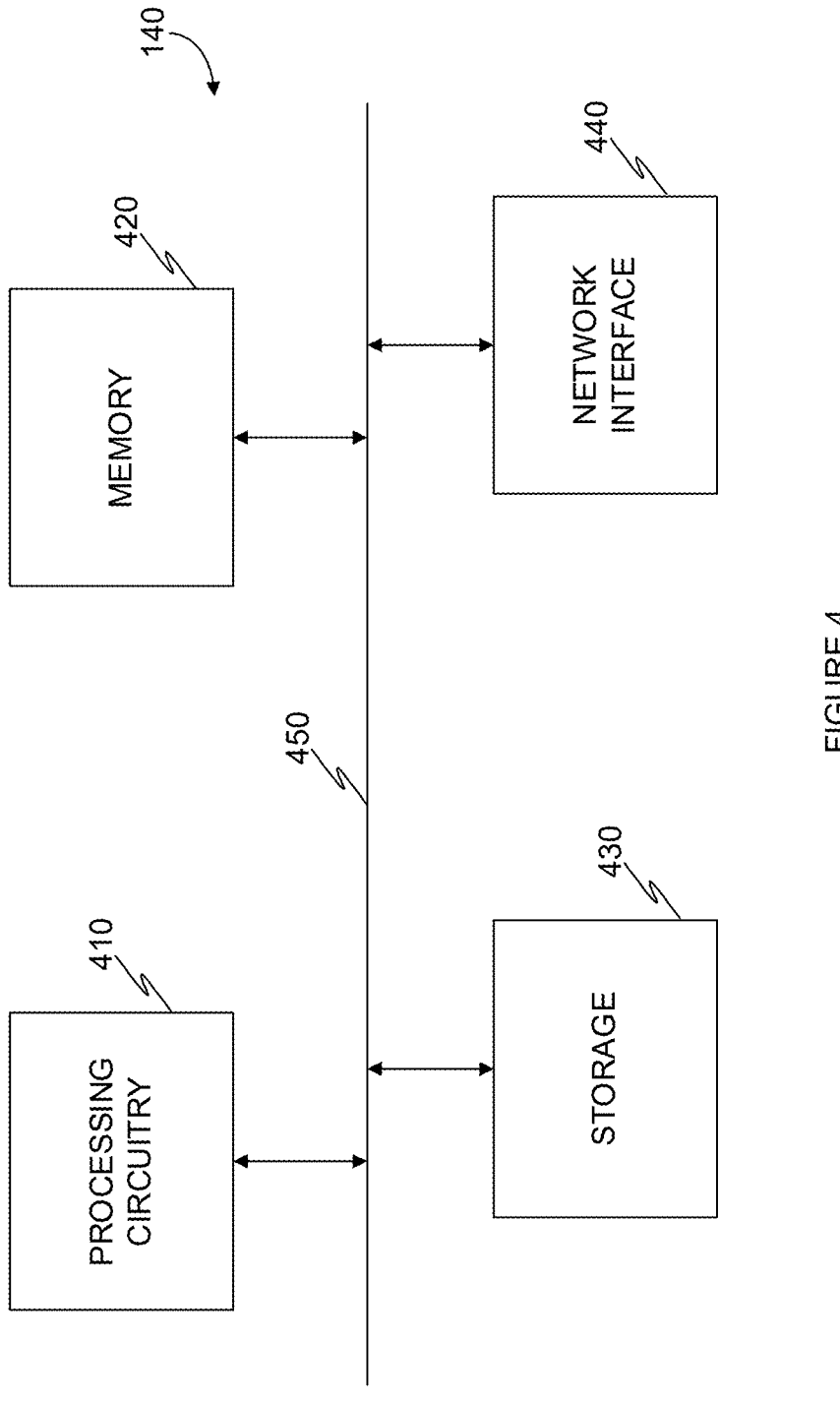
FIG. 4 is an example schematic diagram of a backup system according to an embodiment.

FIG. 4 is an example schematic diagram of a backup system 140 according to an embodiment. The backup system 140 includes, according to an embodiment, a processing circuitry 410 coupled to a memory 420, a storage 430, and a network interface 440. In an embodiment, the components of the backup system 140 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), application-specific standard products (ASSPs), system-on-a-chip systems (SOCs), graphics processing units (GPUs), tensor processing units (TPUs), artificial intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read-only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard disk drive, another memory technology, various combinations thereof, or any other medium which can be used to store the desired information.

The network interface 440 is configured to provide the backup system 140 with communication with, for example, the network 130, according to an embodiment.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, certain devices, and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for reducing deduplication in database backup, comprising:

selecting a first primary key of a database;

extracting a plurality of row groups from the database based on the selected first primary key;

storing the plurality of row groups arranged according to the first primary key in one or more files having a column-oriented data storage format as a database backup at a first time;

reading at least a portion of the database backup at a second time to detect a plurality of changes wherein detecting the plurality of changes includes reading, at the second time, a plurality of rows from the database by querying the database based on utilization of a range of values of the first primary key, and comparing a hash value of the plurality of rows to a corresponding value stored in the database backup;

determining a position of each row corresponding to a change of the plurality of changes;

selecting a second primary key of the database as a primary key, when utilizing the second primary key generates a smaller number of row groups than utilizing the first primary key, wherein the smaller number of row groups includes a change in at least a row; and generating a database backup of the database at the second time based on the selected second primary key, wherein prior to generating the database backup at the second time, the one or more files of the database backup at the first time are rearranged based on the selected second primary key.

2. The method of claim 1, further comprising:

selecting an index key as the first primary key.

3. The method of claim 1, further comprising:

selecting a first key and a second key of the database as the first primary key; and selecting the first key and a third key of the database as the second primary key.

4. The method of claim 1, further comprising:

selecting a first portion of rows of the database;

generating a first plurality of row groups based on extracting the first portion of rows based on the first primary key;

generating a second plurality of row groups based on extracting the first portion of rows based on the second primary key; and selecting the second primary key in response to determining that a number of row groups of the second plurality of row groups which include a change is smaller than the number of row groups of the first plurality of row groups which include a change.

5. The method of claim 1, further comprising:

periodically initiating a check to determine if querying the database utilizing the second primary key results in smaller differential backups than querying the database utilizing the first primary key.

6. The method of claim 1, further comprising:

extracting the plurality of row groups by querying the database based on a range of the first primary key.

7. The method of claim 6, further comprising:

extracting the plurality of row groups at a second time by querying the database based on a range of the second primary key.

8. The method of claim 1, wherein selecting the second primary key comprises selecting a unique key that ensures all values in a column or combination of columns are unique across records.

9. The method of claim 1, further comprising:

generating a differential backup at a third time based on the second primary key.

10. A non-transitory computer-readable medium storing a set of instructions for reducing deduplication in database backup, the set of instructions comprising:

one or more instructions that, when executed by one or more processors of a device, cause the device to:

select a first primary key of a database;

extract a plurality of row groups from the database based on the selected first primary key;

store the plurality of row groups arranged according to the first primary key in one or more files having a column-oriented data storage format as a database backup at a first time;

read at least a portion of the database backup at a second time to detect a plurality of changes, wherein detecting the plurality of changes includes reading, at the second time, a plurality of rows from the database by querying the database based on utilization of a range of values of the first primary key, and comparing a hash value of the plurality of rows to a corresponding value stored in the database backup;

determine a position of each row corresponding to a change of the plurality of changes;

select a second primary key of the database as a primary key, when utilizing the second primary key generates a smaller number of row groups than utilizing the first primary key, wherein the smaller number of row groups includes a change in at least a row; and generate a database backup of the database at the second time based on the selected second primary key, wherein prior to generating the database backup at the second time, the one or more files of the database backup at the first time are rearranged based on the selected second primary key.

11. A system for reducing deduplication in database backup comprising:

one or more processors configured to:

select a first primary key of a database;

extract a plurality of row groups from the database based on the selected first primary key;

store the plurality of row groups arranged according to the first primary key in a file one or more files having a column-oriented data storage format as a database backup at a first time;

read at least a portion of the database backup at a second time to detect a plurality of changes, wherein detecting the plurality of changes includes reading, at the second time, a plurality of rows from the database by querying the database based on utilization of a range of values of the first primary key, and comparing a hash value of the plurality of rows to a corresponding value stored in the database backup;

determine a position of each row corresponding to a change of the plurality of changes;

select a second primary key of the database as a primary key, when utilizing the second primary key generates a smaller number of row groups than utilizing the first primary key, wherein the smaller number of row groups includes a change in at least a row; and generate a database backup of the database at the second time based on the selected second primary key, wherein prior to generating the database backup at the second time, the one or more files of the database backup at the first time are rearranged based on the selected second primary key.

12. The system of claim 11, wherein the one or more processors are further configured to:

select an index key as the first primary key.

13. The system of claim 11, wherein the one or more processors are further configured to:

select a first key and a second key of the database as the first primary key; and select the first key and a third key of the database as the second primary key.

14. The system of claim 11, wherein the one or more processors are further configured to:

select a first portion of rows of the database;

generate a first plurality of row groups based on extracting the first portion of rows based on the first primary key;

generate a second plurality of row groups based on extracting the first portion of rows based on the second primary key; and select the second primary key in response to determining that a number of row groups of the second plurality of row groups which include a change is smaller than the number of row groups of the first plurality of row groups which include a change.

15. The system of claim 11, wherein the one or more processors are further configured to:

periodically initiate a check to determine if querying the database utilizing the second primary key results in smaller differential backups than querying the database utilizing the first primary key.

16. The system of claim 11, wherein the one or more processors are further configured to:

extract the plurality of row groups by querying the database based on a range of the first primary key.

17. The system of claim 16, wherein the one or more processors are further configured to:

extract the plurality of row groups at a second time by querying the database based on a range of the second primary key.

18. The system of claim 11, wherein the one or more processors are further configured to:

select the second primary key as a unique key that ensures all values in a column or combination of columns are unique across records.

19. The system of claim 11, wherein the one or more processors are further configured to:

generate a differential backup at a third time based on the second primary key.

\* \* \* \* \*